United States Patent [19]

Gray

[11] Patent Number: 5,174,760
[45] Date of Patent: Dec. 29, 1992

[54] DISPLAY DEVICE FOR A RAIN TIRE

[75] Inventor: Robert L. Gray, Silver Lake, Ohio

[73] Assignee: The Goodyear Tire & Rubber Company, Akron, Ohio

[21] Appl. No.: 828,395

[22] Filed: Jan. 30, 1992

[51] Int. Cl.$^5$ .................. G09B 25/00; G09F 19/00
[52] U.S. Cl. .................................... 434/376; 40/406
[58] Field of Search ............... 434/376, 126; 446/166, 446/167, 267, 217, 218, 168, 183; 40/406

[56] References Cited

U.S. PATENT DOCUMENTS 3,613,264 10/1969 Vitka et al. ........................ 40/406
4,176,469 11/1979 Timco ................................. 434/126

Primary Examiner—Robert P. Swiatek
Assistant Examiner—Cindy A. Cherichetti
Attorney, Agent, or Firm—David E. Wheeler

[57] ABSTRACT

A display device illustrates the ability of a tire which is designed for rain traction to move through a fluid as compared to a standard tire. The display device comprises a sealed rectangular box having a bottom, two sides, two ends and a lid. Pivoting means is associated with the box which is adapted to alternately rotate one end of the box higher than the other. A fluid contained within the box to provide resistance to the movement of objects through the box and means are provided for observing the movement of objects in the box. In the illustrated embodiment, an object made to resemble a standard radial tire, and an object in the shape of a tire with a deep, wide center groove (a rain tire) are enclosed in the box. In its operation, the box is tilted on the pivot so that one end of the box is raised higher than the other, and the objects are observed as they traverse to the lower end of the box.

6 Claims, 1 Drawing Sheet

DISPLAY DEVICE FOR A RAIN TIRE

BACKGROUND OF THE INVENTION

In commonly owned, co-pending applications 07/666,816; 07/666,811; D667,100; 07/666,329; 07/666,327; 07/666,328; and 07/666,815, a rain tire having an aqua channel is described. The aqua channel is provided to prevent the build up of water in front of a tire as it rotates, by permitting the water to flow through the center of the tire. The build up of water in front of a tire, and the pressure exerted by said water, is the reason that tires sometime undergo hydroplaning in wet conditions. To illustrate this phenomenon, a device is needed through which one can observe the difference in the rolling properties between a tire with an aqua channel and a tire with a conventional tread.

SUMMARY OF THE INVENTION

A display device for illustrating the ability of different objects to move through a fluid is provided. The device comprises: (a) a sealed rectangular box having a bottom, two sides, two ends and a lid, (b) pivoting means associated with the box adapted to alternately rotate one end of the box higher than the other, and (c) a fluid contained within the box to provide resistance to the different objects in their movement through the box. The box is further divided longitudinally into two vertical sections in which two objects are placed side by side. At least one surface of the box, a side, a lid, a bottom or end is adapted to permit viewing the objects as they move through the box. In the illustrated embodiment, the pivoting means comprises a perch and a bracket on the bottom of the box, the bracket being substantially centrally located on the bottom and adapted to engage the perch and permit rotation of the box thereon.

In the illustrated embodiment, the fluid contained in the box is a mixture of water and ethylene glycol.

In a preferred embodiment, the top and sides of the box are clear plastic so that objects in the box can be observed.

The objects have a cylindrical shape and are made to resemble tires, and one of the objects is made to resemble a tire having a wide central groove (an aqua channel).

When the box is rotated on the perch so that one end of the box is higher than the other, the tire having the wide central groove always reaches the other end of the box before the standard tire.

DETAILED DESCRIPTION OF THE INVENTION

Figure 1:
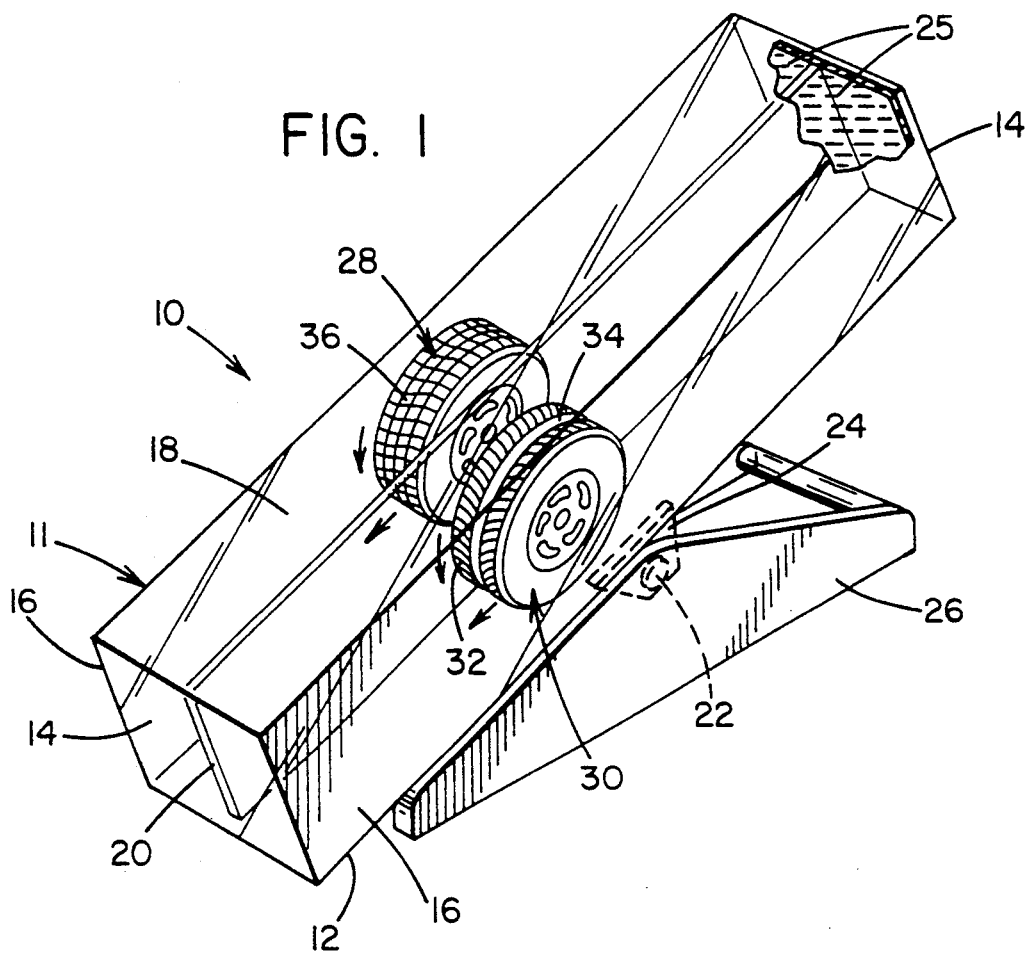
FIG. 1 illustrates a perspective view of the display device of the invention.

With reference now to FIG. 1 in the illustrated embodiment, display device 10 comprises a rectangular box 11 having a bottom 12, ends 14, sides 16, a lid 18, and a septum 20 which divides box 11 longitudinally into two vertical sections, a perch 22 held by base 26, and a bracket 24 which is adapted to permit rotation of box 11 on perch 22. The device also comprises two objects 28 and 30 which are contained in box 11.

Box 11 is sealed to contain a fluid medium 25 in which objects 28 and 30 move. In the preferred embodiment, the fluid is mixture of water and ethylene glycol. Those skilled in the art will recognize that other suitable fluid medium may be provided.

In its operation, when box 11 is at rest, objects 28 and 30 will be in the lower end 14. When the box is rotated on perch 22, the opposite end of box 11 is lowered and objects 28 and 30, by the force of gravity, will roll toward the lower end. By observing which object reaches the opposite end of the box first, one can conclude which object moves through the fluid in the box more easily.

Figure 2:
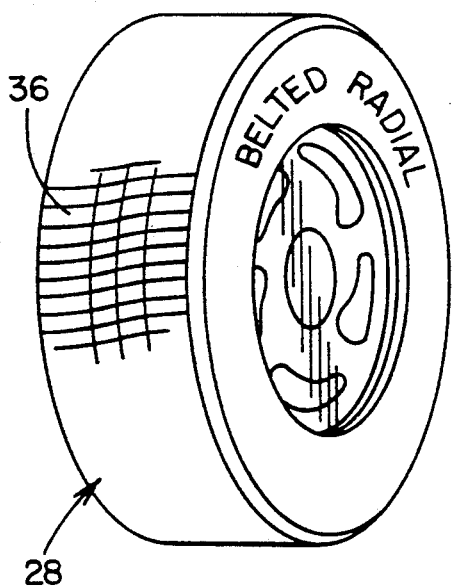
FIG. 2 illustrates the tire-like object used in the display device which resembles a standard tire.
Figure 3:
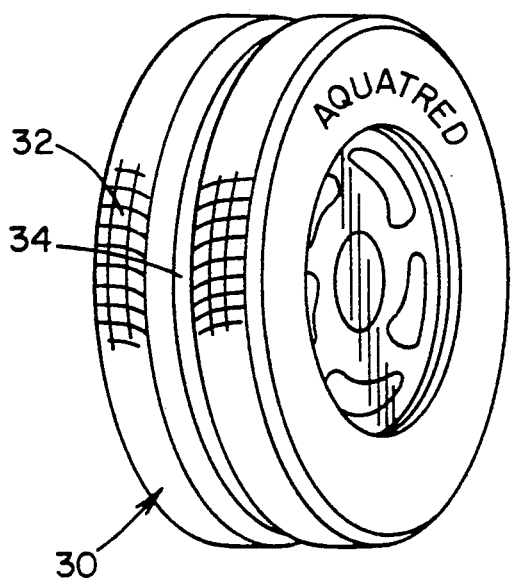
FIG. 3 illustrates the tire-like object made to resemble a rain tire (Aquatred ®).

With reference to FIGS. 2 and 3, in the preferred embodiment of the invention, objects 28 and 30 will comprise cylinders which are made to resemble pneumatic tires. In FIG. 2, cylinder 28 is made to resemble a conventional steel belted radial tire with an all weather tread 36. In FIG. 3, cylinder 30 is made to resemble a rain tire having a wide central groove or aqua channel 34 and directional tread 32.

It has been shown in glass plate testing, that when a conventional tire moves across a wet surface, there is a build up of water in front of the tire. This build up of water, especially at high speeds, can eventually produce a back pressure sufficient to lift the tire off the surface of the road. It was theorized, in designing the Aquatred ® tire, that if a wide center groove is provided in a tire, which provides for the passage of water that tends to accumulate in front of the tire, that the problem of hydroplaning can be minimized, since the build up of pressure by the water in front of the tire is minimized.

The illustrated display device 10 demonstrates that the pressure in the front of the tire is reduced since each time box 11 is tilted, tire (object) 30 reaches the opposite end of the box before tire (object) 28.

While specific embodiments of the invention have been illustrated and described, those skilled in the art will recognize that the invention may be variously modified and practiced without departing from the spirit of the invention. The invention is limited only by the following claims.

What is claimed is:

1. A device for illustrating the ability of different objects to move through a fluid comprising
   (a) a sealed rectangular box having a bottom, two sides, two ends and a lid,
   (b) pivoting means associated with said box adapted to alternately rotate one end of said box higher than the other,
   (c) cylindrical objects made to resemble tires disposed side by side in said box, and
   (d) a fluid contained within said box to provide resistance to said different objects in their movement through the box,
   wherein at least one of said ends, said sides, lid or bottom is adapted to permit viewing of said objects as they move through said box.

2. The device of claim 1 in which said pivoting means comprises a perch and said bottom has a bracket substantially centrally located thereon wherein said bracket is adapted to engage said perch and permit rotation of said box thereon.

3. The device of claim 1 in which said fluid is a mixture of water and ethylene glycol.

4. The device of claim 1 in which the top and sides of said box are clear plastic.

5. The device of claim 1 in which one of said objects is made to resemble a tire having a wide central groove.

6. A device for illustrating the ability of different objects to move through a fluid comprising
   (a) a sealed rectangular box having a bottom, two sides, two ends and a lid,
   (b) pivoting means associated with said box adapted to alternately rotate one end of said box higher than the other,
   (c) a septum dividing said box longitudinally in two vertical sections,
   (d) objects having a cylindrical shape placed in each said vertical section, and
   (e) a fluid contained within said box to provide resistance to said different objects in their movement through the box,
wherein at least one of said ends, said sides, lid or bottom is adapted to permit viewing of said objects as they move through said box.

* * * * *